(12) United States Patent
Davis et al.

(10) Patent No.: US 7,818,239 B1
(45) Date of Patent: Oct. 19, 2010

(54) DIVIDEND ACCOUNTING

(75) Inventors: Robert Davis, London (GB);
Massimiliano Cavalli, London (GB);
James Levi, London (GB); Simon Mehaffey, London (GB); Tim Neary, New York, NY (US); Paul Chinnick, Guildford (GB)

(73) Assignee: Morgan Stanley, New York, NY (US)

( * ) Notice: Subject to any disclaimer, the term of this patent is extended or adjusted under 35 U.S.C. 154(b) by 494 days.

(21) Appl. No.: 11/565,275

(22) Filed: Nov. 30, 2006

Related U.S. Application Data

(60) Provisional application No. 60/827,911, filed on Oct. 3, 2006.

(51) Int. Cl.
*G06Q 40/00* (2006.01)
(52) U.S. Cl. ........................ 705/36 R; 705/37
(58) Field of Classification Search .............. 705/35–37
See application file for complete search history.

(56) References Cited

U.S. PATENT DOCUMENTS

| | | | | |
|---|---|---|---|---|
| 7,236,955 | B2 * | 6/2007 | Sugahara | 705/37 |
| 2002/0091625 | A1 * | 7/2002 | Blauvelt et al. | 705/37 |
| 2002/0194099 | A1 * | 12/2002 | Weiss | 705/36 |
| 2006/0041490 | A1 * | 2/2006 | Roberts et al. | 705/35 |
| 2006/0116944 | A1 * | 6/2006 | Perg et al. | 705/35 |

* cited by examiner

*Primary Examiner*—Jagdish N Patel
*Assistant Examiner*—Kevin Poe
(74) *Attorney, Agent, or Firm*—K&L Gates LLP

(57) ABSTRACT

Methods of allocating dividends to a set of long positions. The methods may comprise the steps of identifying a set of short positions and matching the set of short positions with selected long positions from the set of long positions. The methods may also comprise the step of allocating a manufactured dividend to each of the selected long positions. Each manufactured dividend may originate from one of the set of short positions. The methods may additionally comprise the step of allocating a real dividend to any long positions remaining in the set of long positions.

22 Claims, 12 Drawing Sheets

DIVIDEND ACCOUNTING

CROSS-REFERENCE TO RELATED APPLICATIONS

This application claims the benefit of U.S. Provisional Application No. 60/827,911, filed on Oct. 3, 2006.

BACKGROUND

When a company pays a dividend, those who hold long and/or short positions in the company's stock (e.g., firms, funds, individuals, etc.) accrue rights and obligations corresponding to their position. For example, a long position holder who is the shareholder of a stock is entitled to a real dividend. The real dividend is paid by the company to the shareholder (e.g., directly or indirectly). The shareholder receives an amount equal to the announced dividend, minus any withholding tax paid to the relevant taxing authority. The situation is handled somewhat differently when the long position holder has loaned their stock to a third party. In this case, the real dividend may be paid to the third party, or even to someone else, for example, if the third party has sold the borrowed stock. In this case, the third party is obligated to make the long position holder whole by generating and paying a manufactured dividend. Various tax rules must also be taken into consideration.

For large financial firms and other similar institutions keeping track of real and manufactured dividends may present a considerable problem. For example, firms often hold multiple positions in their own right and for clients. If any of the firm's positions overlap, or offset each other, then the firm may not receive enough real dividends to pay the long position holders. Deficiencies are made up by manufactured dividends from the short position holders. When a dividend is announced, the firm must determine which long positions will receive real dividends, which will receive manufactured dividends, and correctly apply the applicable tax and other regulations.

SUMMARY

In one aspect, various embodiments of the present invention are directed to methods of allocating dividends to a set of long positions. The methods may comprise the steps of identifying a set of short positions and matching the set of short positions with selected long positions from the set of long positions. The methods may also comprise the step of allocating a manufactured dividend to each of the selected long positions. Each manufactured dividend may originate from one of the set of short positions. The methods may additionally comprise the step of allocating a real dividend to any long positions remaining in the set of long positions.

According to various embodiments, the methods may also comprise the steps of summing stock loan linked positions and finding a match quantity for each stock loan linked position. The match quantity may correspond to a portion of the stock loan linked positions that can be offset by stock loan book positions. If the sum of the stock loan linked positions is short, then the methods may also comprise the steps of apportioning a percentage of short stock loan book positions to a stock loan linked long pool and matching the stock loan book positions in the stock loan linked long pool with short stock loan linked positions selected from the stock loan linked positions. The percentage may be equal to the percentage of the stock loan book positions represented by the match quantity. If the sum of the stock loan linked positions is long, then the methods may also comprise the steps of apportioning a second percentage of long stock loan hook positions to a stock loan linked short pool and matching the stock loan book positions in the stock loan linked short pool with long stock loan linked positions selected from the stock loan linked positions. The second percentage may also be equal to the percentage of the stock loan book positions represented by the match quantity. System and computer readable medium embodiments are also disclosed.

DRAWINGS

Embodiments of the present invention are described below, by way of example, in conjunction with the following figures, wherein.

DESCRIPTION

Figure 1:
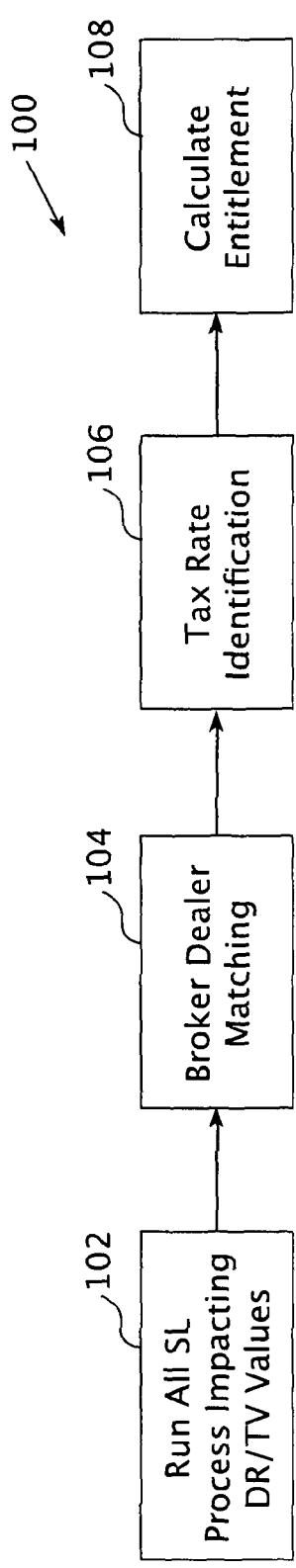
FIGS. 1-4 show flow charts illustrating process flows according to various embodiments.

FIG. 1 shows a process flow 100 for calculating and implementing dividend entitlements for a plurality of positions (e.g., positions held by a single firm). For the sake of simplicity, the processes are described with respect to the stock of one issuer, however, it will be appreciated that various embodiments may be configured to process dividends paid on the stock of multiple issuers simultaneously, sequentially, etc. At step 102, positions on the firm's stock loan book may be processed and the entitlements for these positions found. Exemplary ways of calculating the entitlements of stock loan book positions are described below, for example, with reference to FIGS. 2-10. Referring back to FIG. 1, positions on the firm's broker-dealer book may be matched at step 104. This may involve matching long positions that should receive a dividend with corresponding short positions that should generate a corresponding manufactured dividend. According to various embodiments, positions having similar tax consequences may be matched. At step 106, the tax rates and regulations applicable to each of the accounts may be found and applied. At step 108, the entitlement for each remaining account may be generated, for example, based on the results of the previous steps.

Figure 2:
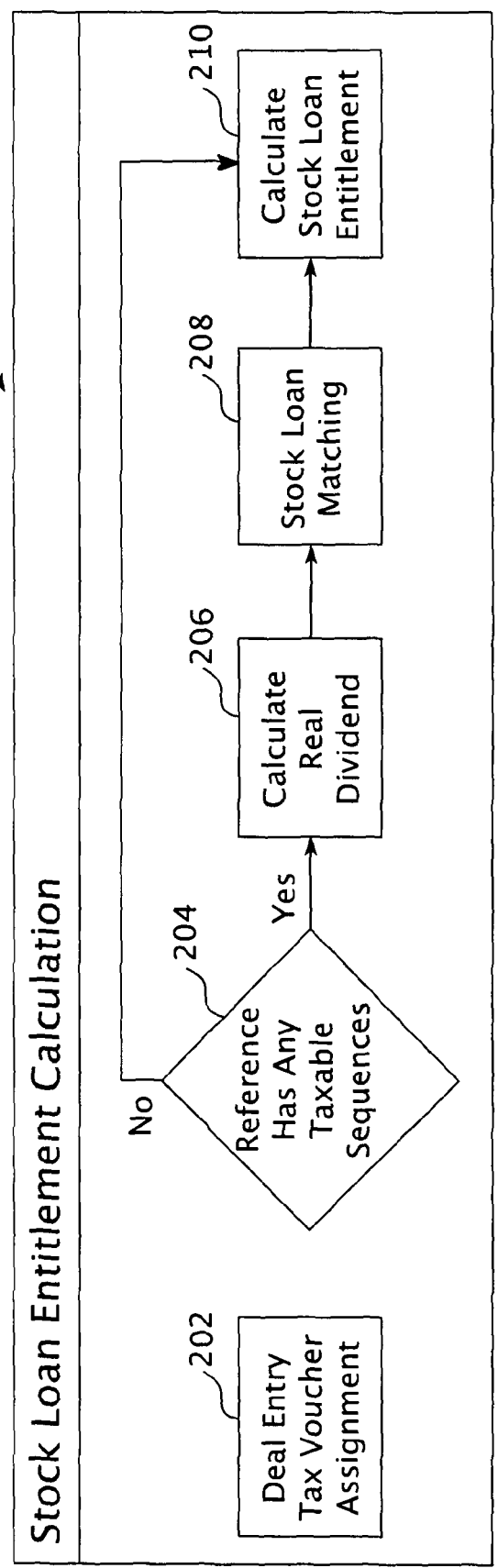

FIG. 2 shows a process flow 200 for calculating the entitlements of positions on the firms stock loan books. These positions may reflect, for example, borrows made by a stock loan desk or group of the firm. In various embodiments, positions on the stock loan book may have corresponding linked positions on the firm's broker-dealer book. For example, the stock loan desk may borrow in to cover short positions held by the various broker-dealer desks, trading desks, etc. Also, the stock loan desk may borrow out shares on long positions held by the broker-dealer desks, trading desks, etc. The entitlement calculation for stock loan positions is described herein with reference to United Kingdom tax regulations including the Manufactured Overseas Dividend rules or MOD rules. It will be appreciated, however, that various embodiments may be implemented to include stock and/or accounts subject to other tax or regulatory schemes in addition to or instead of the United Kingdom rules. For example, various embodiments may account for United States rules that reduce the tax rate on dividends to capital gains levels for certain persons. In this instance, the amount of any manufactured dividend paid to an eligible United States client may be increased by a certain amount (e.g., 30%).

Referring again to FIG. 2, at step 202, the tax voucher status of each account/position may be determined. This may involve determining how applicable tax regulations apply based on, for example, the client, the firm and/or the domicile of the issuer. An exemplary process for determining the tax voucher status of an account is described below with respect to FIG. 3. At step 204, it may be determined whether an account has any additional tax consequences that should be considered. If not, then the process may calculate the entitlement of the stock loan account, for example, at step 210. If the account does have additional tax consequences, the real dividend, if any, associated with the account may be calculated at step 206.

After real dividends have been considered, stock loan matching may occur at step 208. Stock loan matching may involve pairing accounts with similar and/or complimentary tax consequences. Exemplary embodiments for stock loan matching are described in more detail below. In various embodiments, matching may allow the firm to maximize its tax position while insuring that all accounts are properly handled. At step 210, the entitlements of the account positions may be found, for example, considering the tax consequences and matching described above.

Figure 3:
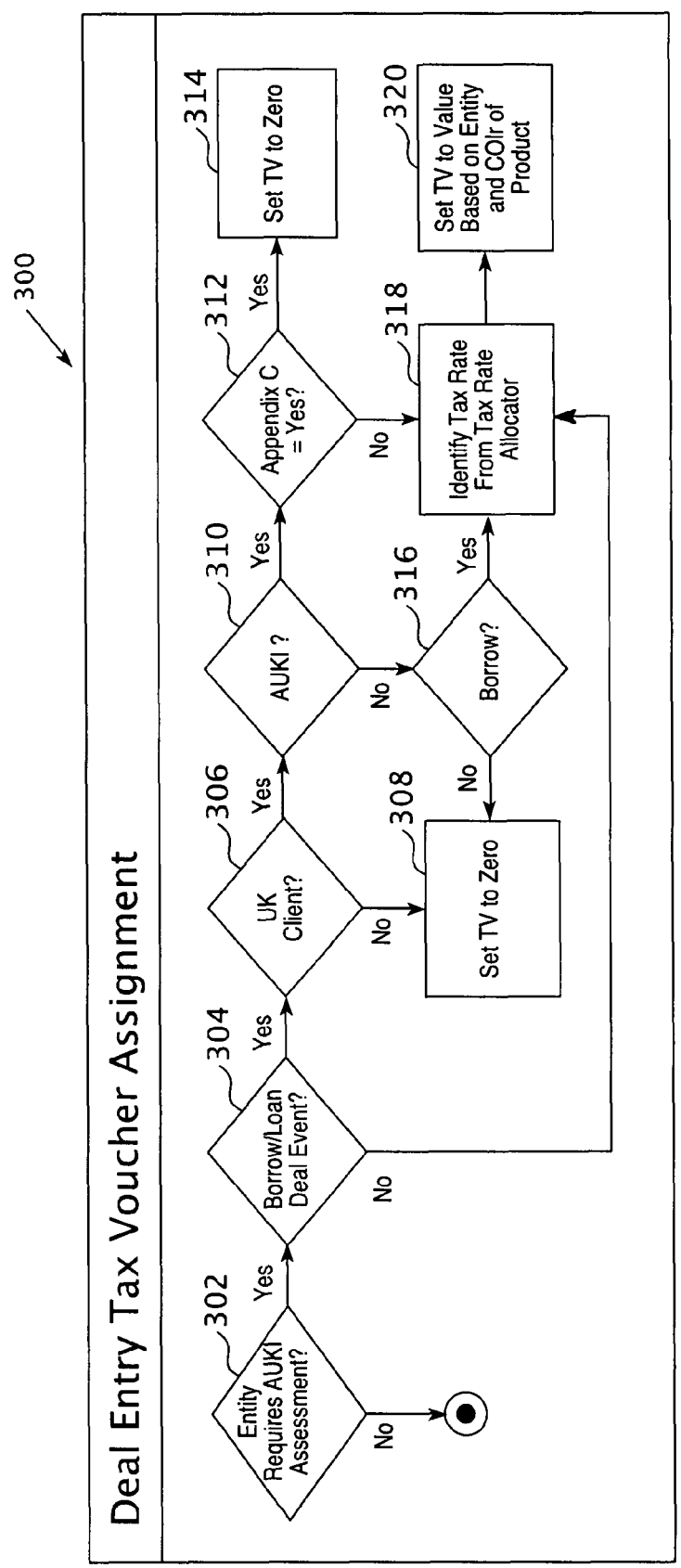

FIG. 3 shows a process flow 300, according to various embodiments, for finding the tax voucher status of various accounts/positions, for example, as discussed above at step 202 of the process flow 200. At step 302 it may be determined whether an account requires an AUKI or Authorized United Kingdom Intermediary assessment. This assessment may be required based on various factors including, for example, the domicile of the client, the domicile of the firm, the domicile of the company paying a dividend, etc. If the account does not require AUKI assessment, then the United Kingdom tax regulations may not apply. If an AUKI assessment is required, it may be determined if the account is a borrow or loan at step 304. For example, it may be determined whether an account has either borrowed or loaned the stock paying a dividend.

At step 306, it may be determined whether the client corresponding to a particular position or account is domiciled in the United Kingdom. If the client is not domiciled in the United Kingdom, then the client may be entitled to receive a gross dividend, and the tax voucher status of the account may be set to zero at step 308. If the client is a United Kingdom domiciliary, then it may be determined whether the client is an Authorized United Kingdom Intermediary or AUKI at step 310. If the client is an AUKI, then it may be determined at step 312 whether the client has provided the firm with an Appendix C document. The Appendix C document may indicate that the client is authorized to receive and gross dividend and be responsible for the payment of United Kingdom taxes on the gross dividend. If the client has provided an Appendix C document, then the tax voucher status of the account may be set to zero at step 314.

Referring back to step 310, if the client is not an AUKI, then it may be determined at step 316 whether the pending status of the account is a borrow (e.g., the stock/loan desk has borrowed shares from the client). If this is the case, then the tax rate allocated to the account may be chosen at step 318. The tax rate may be chosen based on various factors including, for example, the tax domicile of the issuer, the tax domicile of the client, etc.

Figure 5:
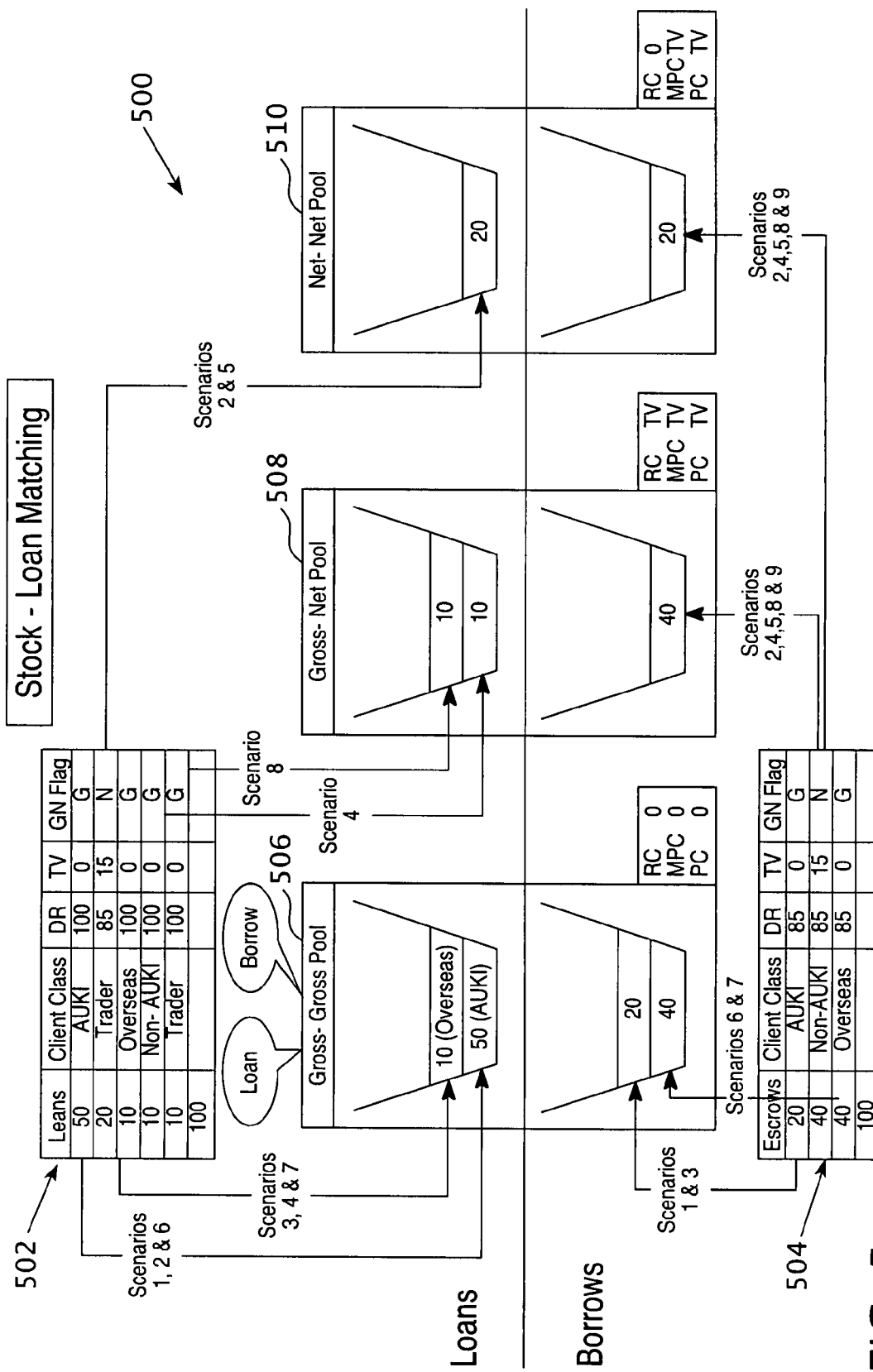
FIG. 5 shows a diagram illustrating position pools according to various embodiments.

After tax consequences are dealt with, then the various stock loan positions may be matched with one another, for example, to insure that proper manufactured dividends are collected and distributed, and/or to balance applicable tax payments. FIG. 5 shows a diagram 500 of an exemplary series of pools to which stock loan transactions may be assigned, for example, according to dividend payment methods. The diagram 500 includes an exemplary list of loans 502, an exemplary list of borrows 504 as well as three pools 506, 508, 514. Gross-gross pool 506 may include loans and borrows that pay a gross dividend (e.g., a dividend without withholding tax and/or a tax voucher). Gross-net pool may include loans that receive a gross manufactured dividend and borrows that pay a net manufactured dividend. A borrow may pay a net dividend, for example, because of applicable tax. Net-net pool 510 may include loans and borrows having net dividends. It will be appreciated that a given stock loan will be classified as gross or net based on the relevant tax regulations, including those of the issuer's domicile, the client's domicile, etc. For example, a net dividend may not include amounts corresponding to the withholding tax of the issuer's domicile and/or the income tax of the client's domicile.

Figure 4:
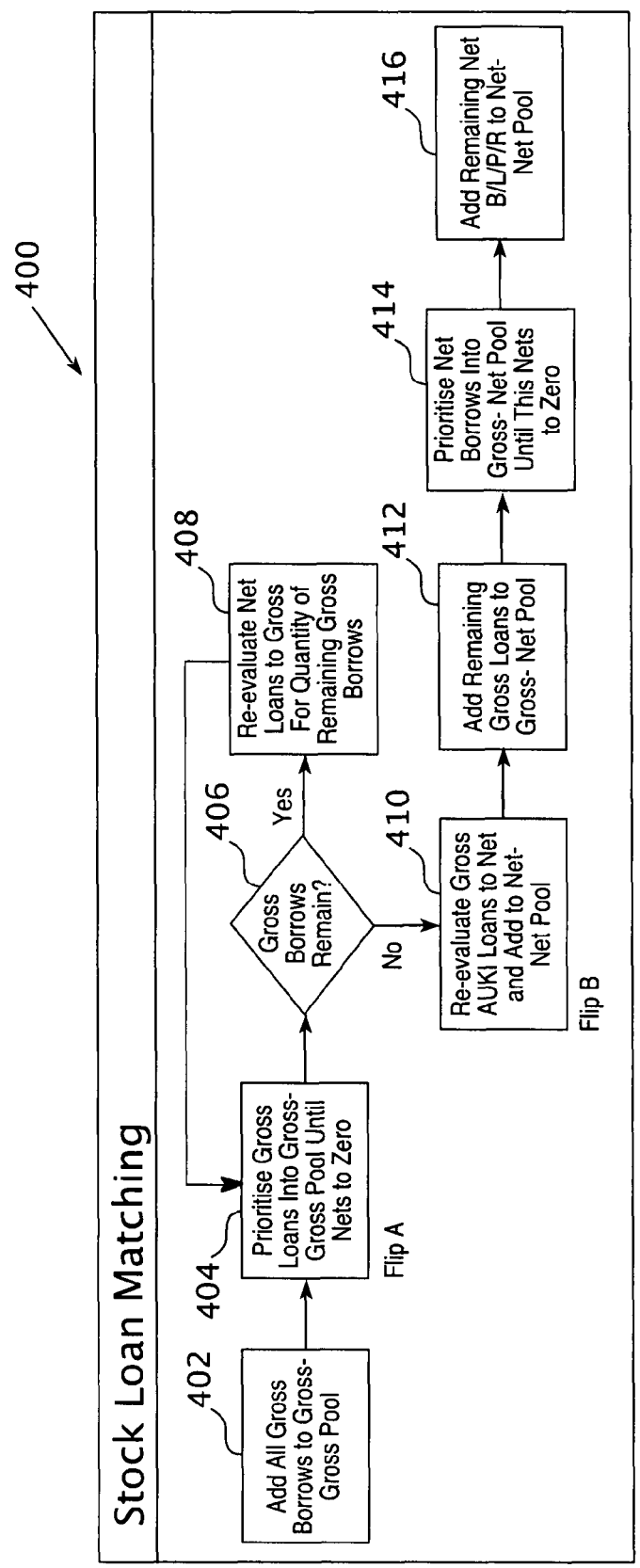

FIG. 4 shows a process flow 400 for allocating stock loans to the various pools 506, 508, 510. At step 402, all gross borrows are added to the Gross-Gross Pool 506. The gross borrows included in the borrow list 504 of FIG. 5, may be those to AUKI clients and those to overseas clients. In the context of the United Kingdom MOD rules, AUKI clients may be clients who are empowered under the Inland Revenue regulations to account for their own tax, and are therefore able to receive a gross manufactured dividend. Overseas clients may not be subject to the MOD rules, and therefore may also be entitled to receive a gross manufactured dividend. At step 404, gross loans may be prioritized into the Gross-Gross Pool 506 according to any suitable hierarchy until the pool 506 nets to zero. For example, one suitable hierarchy may involve matching external (e.g., client) positions to the Gross-Gross Pool 506 before internal positions.

Referring again to FIG. 5, sixty gross borrows were placed in the Gross-Gross Pool 506 at step 402. According the exemplary hierarchy, external gross loans may be allocated to the Gross-Gross Pool 506 next. When there are more external gross loans than are required to balance the Gross-Gross Pool 506, then the available external gross loans may be prioritized in any suitable way. For example, in various embodiments, gross AUKI loans may be allocated to the Gross-Gross Pool 506 first to avoid negative tax consequences from matching gross AUKI loans with net borrows. Accordingly, referring to FIG. 5, the fifty gross AUKI loans from the loan list 502 are allocated to the Gross-Gross Pool 506, leaving ten unmatched gross borrows. The Pool 506 may then be balanced by adding ten overseas loans from the loan list 502. In various embodiments, the ten non-AUKI loans in the list 502 could have been selected instead of the ten overseas loans with a minimal change in result.

If any gross borrows remain at step 406 after all gross loans have been allocated (e.g., if the Gross-Gross Pool 506 is unbalanced), then some or all of the net loans may be reevaluated as gross loans at step 408. In various embodiments, it may be undesirable to match a gross borrow and a net loan. This is because when a gross dividend is paid to a lender, a gross dividend should also be received from a corresponding borrower to allow the numbers to match. It will be appreciated that a manufactured dividend received on a net loan will include a net cash payment and a tax voucher representing the difference between the net and the gross dividend. The tax voucher may be used to offset the firm's total tax liability at the end of a year. Accordingly, a net loan may be reevaluated as a gross loan by considering the tax voucher as cash (e.g., by transferring the tax voucher to a linked holding account and transferring cash from the holding account to replace it). Net loans may be reevaluated as gross loans and added to the Gross-Gross Pool 506 according to any suitable hierarchy.

If no gross borrows remain at step 406 after the Gross-Gross Pool 506 has been balanced, then the other pools 508, 510 may be populated. At step 410, any remaining gross AUKI loans may be re-evaluated to net at step 410 and added to the Net-Net Pool 510. It may be undesirable to match gross AUKI loans with net borrows. This is because when paying a net dividend to a lender out of a gross dividend received from a borrower, the MOD rules are broken and an Appendix C document cannot be provided. Accordingly, the dividend received from the AUKI borrower would have to be net rather than gross. Accordingly, the remaining gross AUKI loans may be reevaluated to net by amending the dividend rate/tax voucher to treaty rate plus definitive tax/tax credit—definitive tax.

Referring back to the process flow 400, at step 412, any remaining gross loans may be added to the Gross-Net Pool 508. In various embodiments, the Gross-Net Pool 508 can be further split into two different distinct pools to enable the calculation and/or generation of Primary and Reverse charges under the United Kingdom MOD rules. For example, it may be desirable to add trader gross loans to the Gross-Net Pool 508 first. At step 414, net borrows may be prioritized and added to the Gross-Net Pool 508 until they counter the trader gross loans and the Gross-Net Pool 508 is balanced. The net borrows may be prioritized according to any suitable hierarchy. Remaining net borrows and net loans may be added to Net-Net Pool 510, for example, at step 416.

Figure 6:
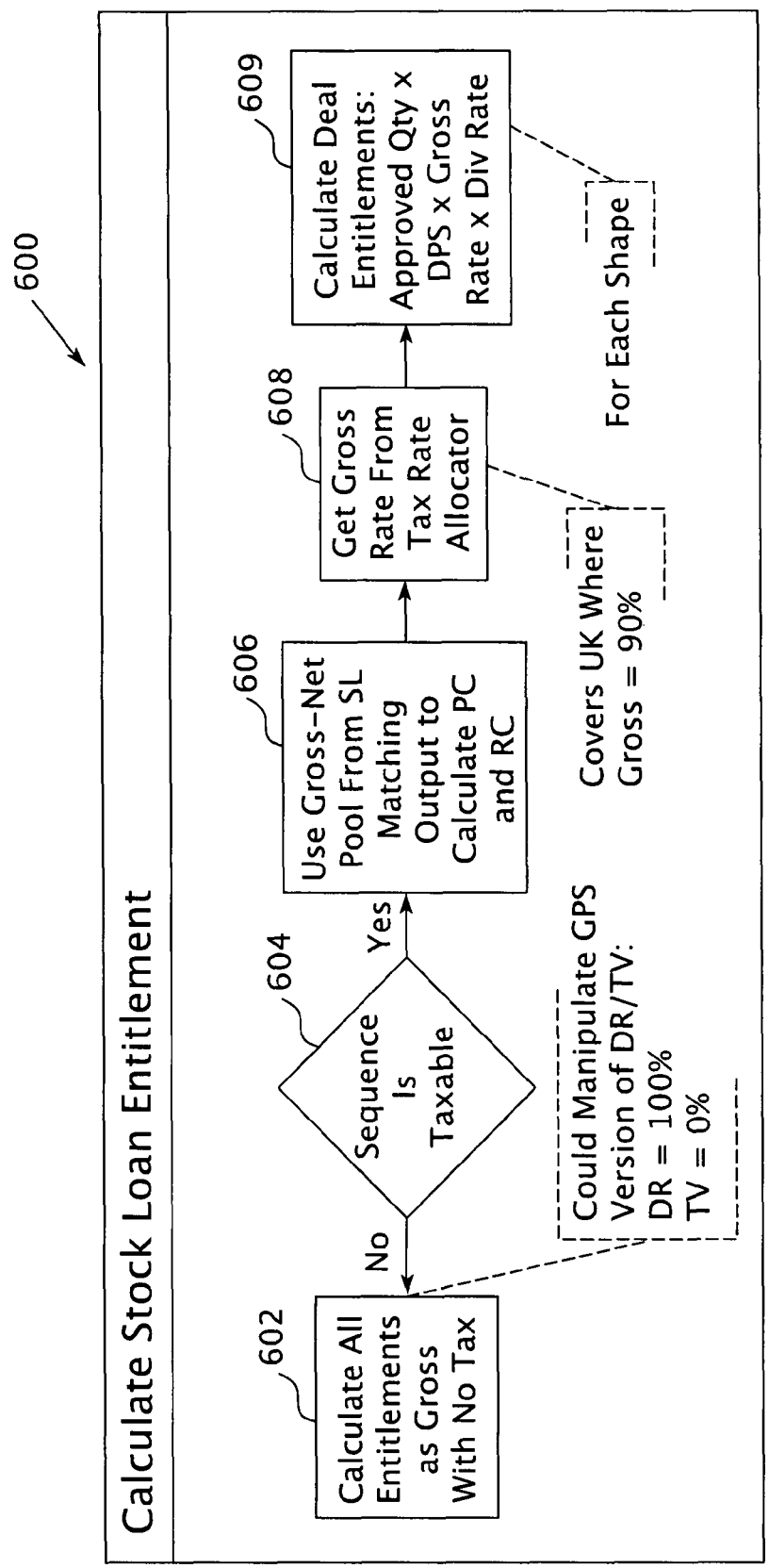
FIGS. 6-7 show flow charts illustrating process flows according to various embodiments.

After stock loan matching has been completed, stock loan entitlements may be calculated, for example, as shown by process flow 600 in FIG. 6. At step 604, it may be determined whether a given dividend to an account and/or position is taxable. If not, then all entitlements may be calculated as gross with no tax at step 602. If the sequence is taxable, then the primary charge and reverse charge applicable to the account under the United Kingdom MOD rules may be found at step 606. The Primary charge and Reverse charge may be found considering the stock loan matching illustrated by FIGS. 4 and 5. For example, accounts and/or positions matched in the same pool 506, 508, 510 may be considered together for determining the relevant tax consequences.

At step 608, the gross tax rate applicable to a loan or borrow may be found. The gross tax rate may represent the amount of the dividend minus any irretrievable tax due, for example, to income or other tax levied by the client's domicile. At step 609, deal entitlements for each stock loan transaction may be calculated according to any suitable method. For example, the approved quantity of shares loaned or borrowed may be multiplied by the dividends per share, the gross rate, and the dividend rate.

Figure 7:
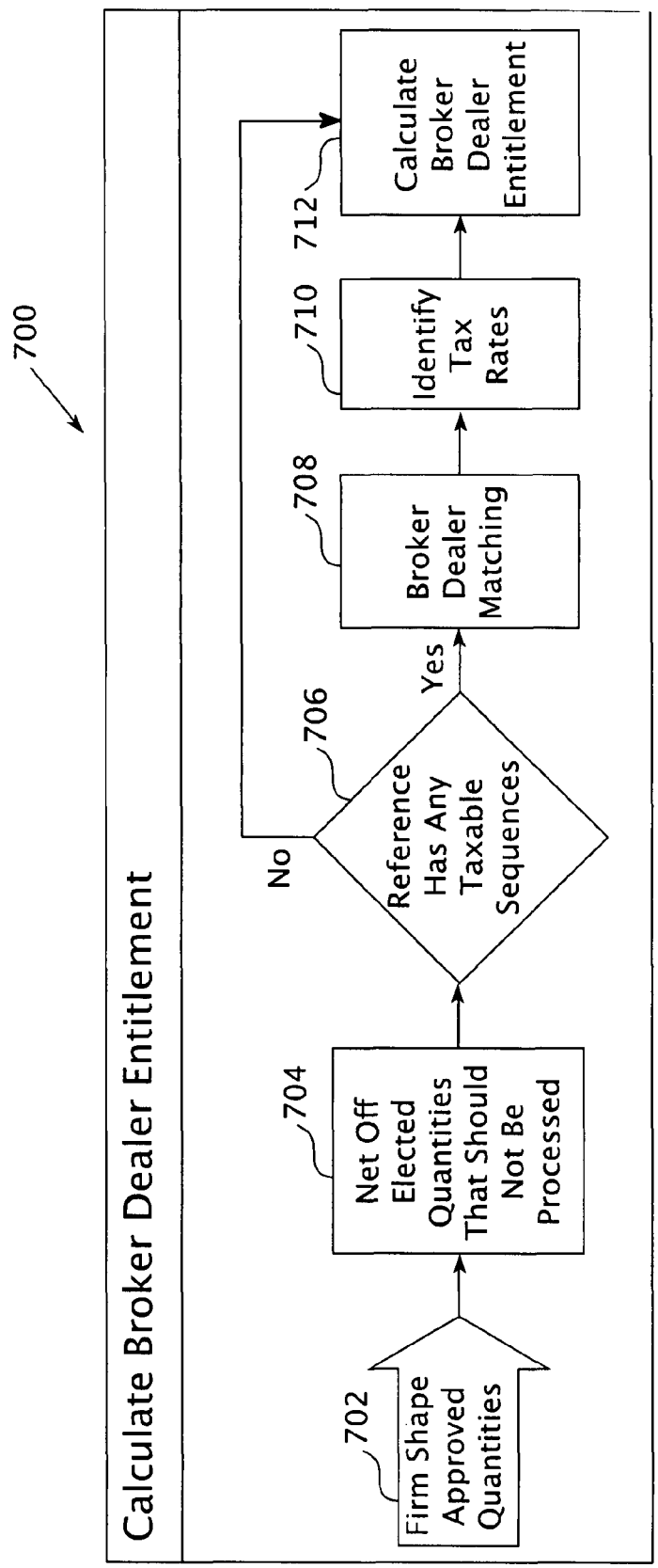

According to various embodiments, the entitlements of accounts on the firm's broker-dealer books may also be found, for example, as described above with respect to steps 104, 106 and 108 of the process flow 100 shown in FIG. 1. FIG. 7 shows another process flow 700 for calculating the entitlements of broker-dealer book accounts according to various embodiments. Firm shape approved quantities 702, or other suitable accounts or positions may be considered. At step 704, elected quantities that should not be processed are netted off into a netted pool, such as netted pool 802 shown in FIG. 8. Examples of quantities that should not be processed include accounts that typically do not hold positions, such as accounts used for internal accounting, accounts that do not logically match other accounts, etc. In various embodiments, some account types included in the netted pool may be netted together. Also, it will be appreciated that, in various embodiments, the netted pool need not balance.

Figure 8:
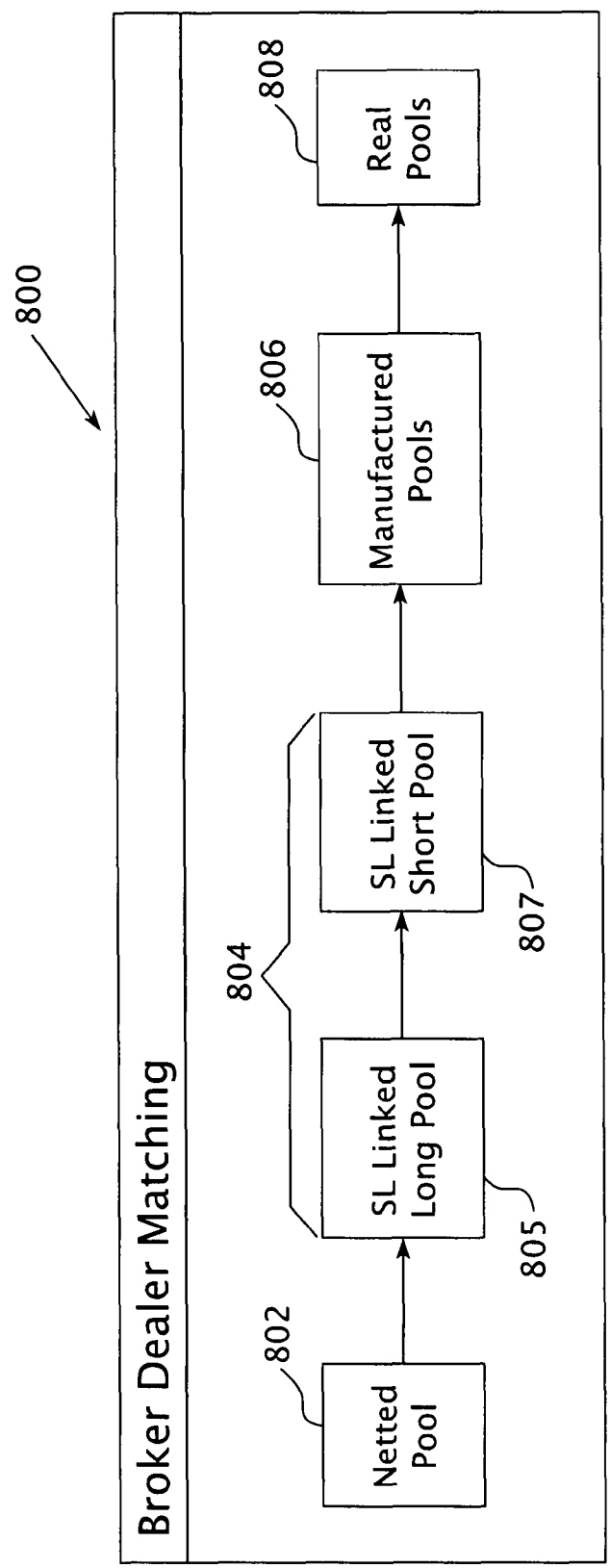
FIG. 8 shows a diagram illustrating position pools according to various embodiments.

At step 706, it may be determined if an account has a taxable sequence. If not, then the process flow may proceed to step 712, where the entitlement for the account may be found. If the account has a taxable sequence, then the process may proceed to broker dealer matching at step 708. For example, FIG. 8 shows a chart 800 of pools, according to various embodiments, into which broker-dealer accounts may be matched. The chart 800 may include four broad categories of pools including, for example, the netted pool 802, stock loan linked pools 804, a manufactured pool or pools 806 and a real pool or pools 808. The matching process may involve matching broker-dealer accounts and/or positions having similar dividend/tax consequences into similar pools, for example, as described below. Referring back to the process flow 700, at step 710, the tax rates applicable to the various accounts may be found. At step 712, broker-dealer entitlements may be found considering the matching process, the tax rates, and any other necessary or desirable criteria.

Figure 9:
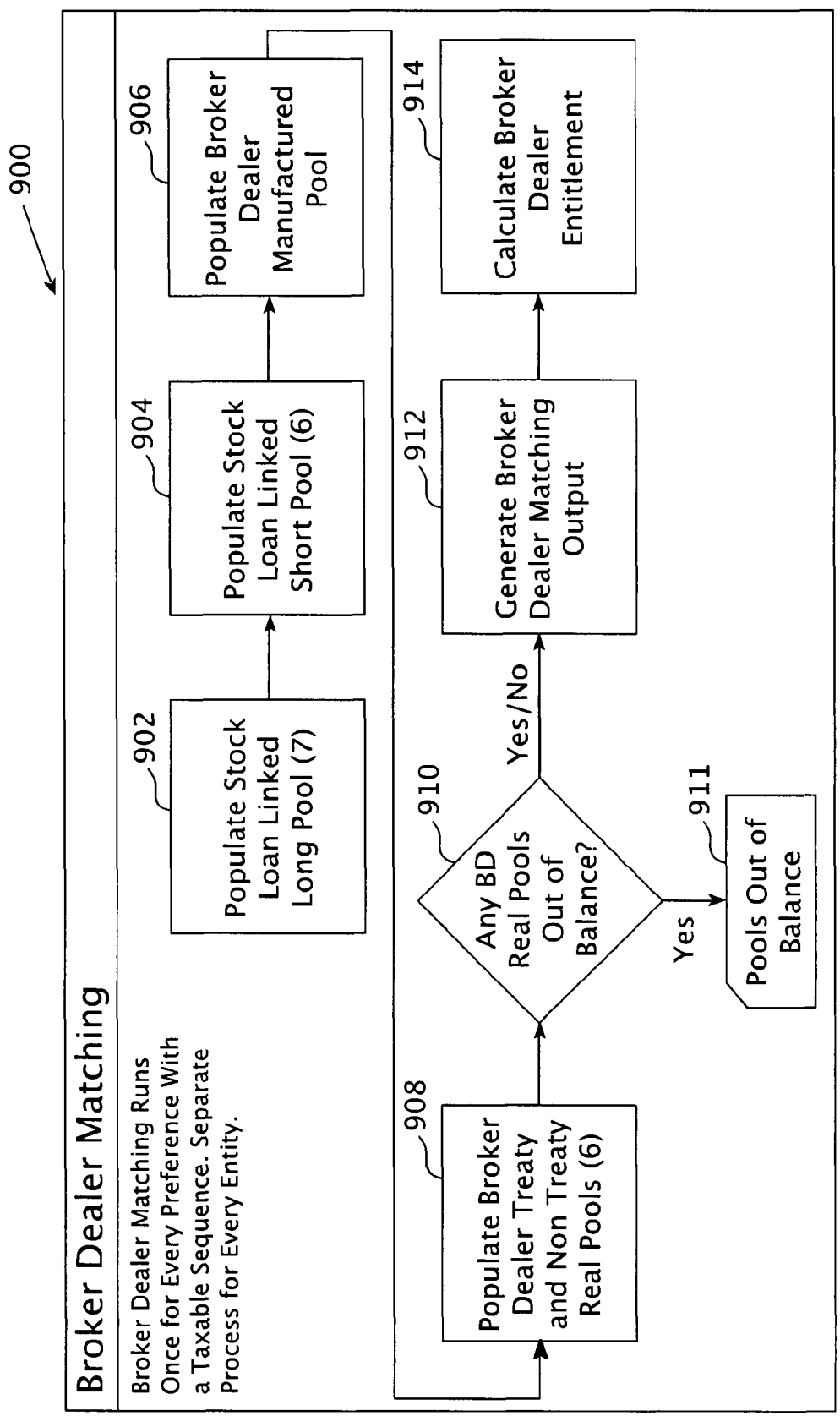
FIGS. 9-11 show flow charts illustrating process flows according to various embodiments.

FIG. 9 shows a process flow 900, according to various embodiments, for performing broker dealer matching, for example, as described above by chart 800 and step 708. At step 902, the Stock Loan Linked Long Pool 805 may be populated, for example, as described below with respect to the process flow 1000 shown in FIG. 10. At step 904, the Stock Loan Linked Short Pool 807 may be populated, for example, as described below with respect to the process flow 1100 shown in FIG. 11. The Stock Loan Linked Long Pool 805, and Stock Loan Linked Short Pool 807 may include broker-dealer book positions that are linked to stock-loan book positions. It will be appreciated that the stock-loan book positions corresponding to stock loan linked broker-dealer book positions may be handled separately, for example, as described above. At step 906, one or more manufactured pools 806 may be populated, for example, as discussed below. At step 908, the population of the real pools 808 may be accomplished. According to various embodiments, the real pools may be split into treaty and non-treaty real pools, for example, as discussed below. At step 910, it may be determined whether any of the real pools are out of balance. If so, an "Out of Balance" flag 911 may be set to allow for further debugging/troubleshooting. At step 912, the results of the broker-dealer matching may be generated. Broker-dealer entitlements may be calculated at step 914, based on the results of the matching.

Figure 10:
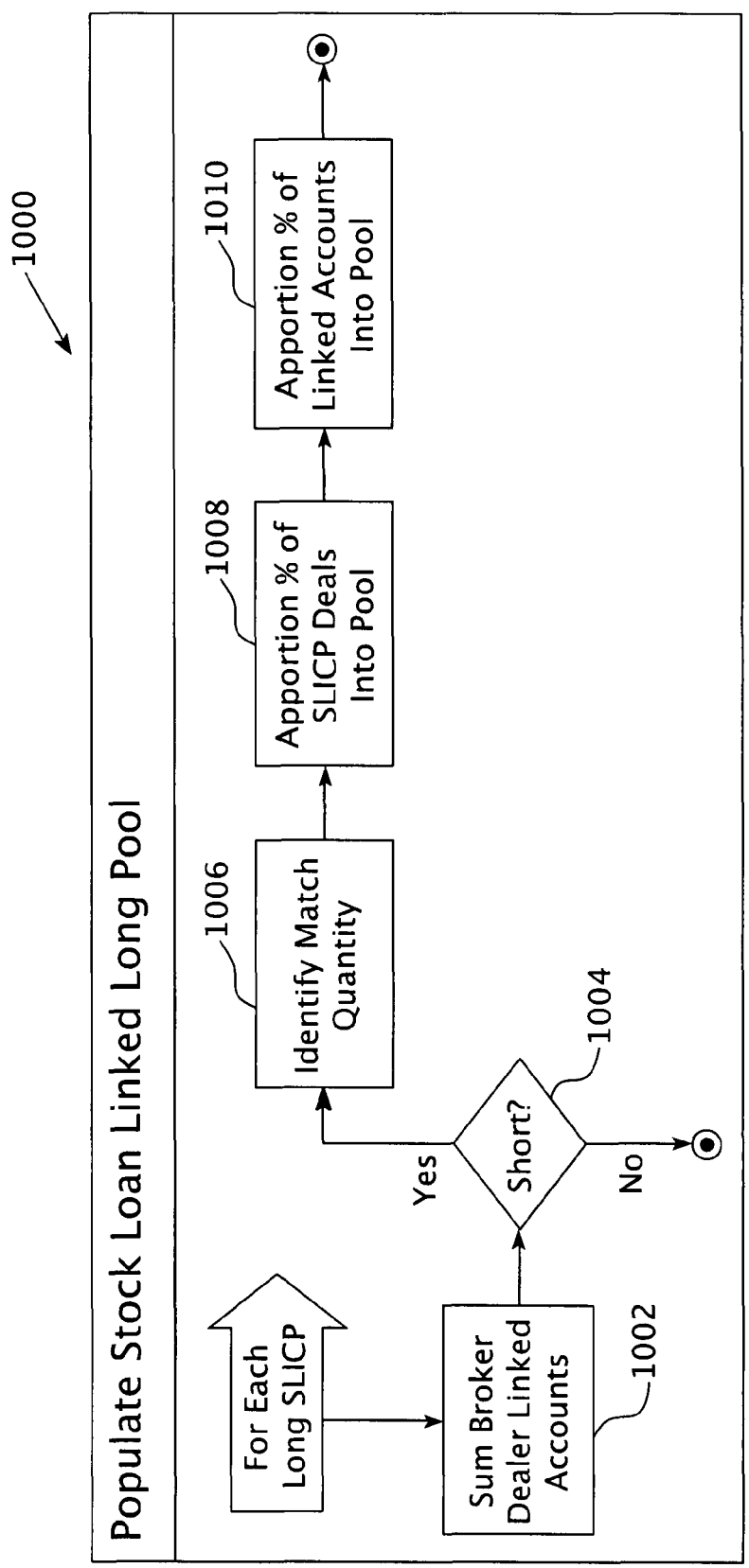

FIG. 10 shows a process flow 1000, according to various embodiments, for populating the Stock Loan Linked Long Pool 805. For each long stock loan book account that exists on the issuer, all of the corresponding stock loan linked broker-dealer accounts (e.g., the corresponding link group) may be summed at step 1002. If, at step 1004, the sum of the stock loan linked accounts is short, then a match quantity may be found at step 1006. (In various embodiments, no long pool may be created if the sum is long or flat.) The match quantity may represent the portion of the stock-loan linked account position that can be cancelled by the corresponding stock loan book position and accordingly added to the long pool 806. For example, if the sum of stock loan linked broker-dealer accounts is short by 100 shares, and the sum of the corresponding stock loan book position is long by 100 shares, then the match quantity may be 100 shares.

At step 1008, a percentage of the long stock loan book positions may be assigned to the Stock Loan Linked Long Pool 804. The percentage may be chosen, for example, based on the percentage of the stock loan book positions that carried over to the match quantity. The same percentage of the short stock loan linked accounts from the link group may also be allocated to the Stock Loan Linked Long Pool 804, for example, at step 1008. In various embodiments, only short stock loan linked account positions may be added. The positions to be added may be selected according to any suitable method such as, for example, pro rata, choosing the largest quantity first, fill-your-boots, etc. Any residual positions left in the stock loan book position, or the corresponding linked group of the broker-dealer book, may remain for later allocation to other pools, as described herein below. It will be appreciated that the long stock loan book positions and the short stock loan linked accounts included in the Stock Loan Linked Pool 806 may net to a flat position.

Figure 11:
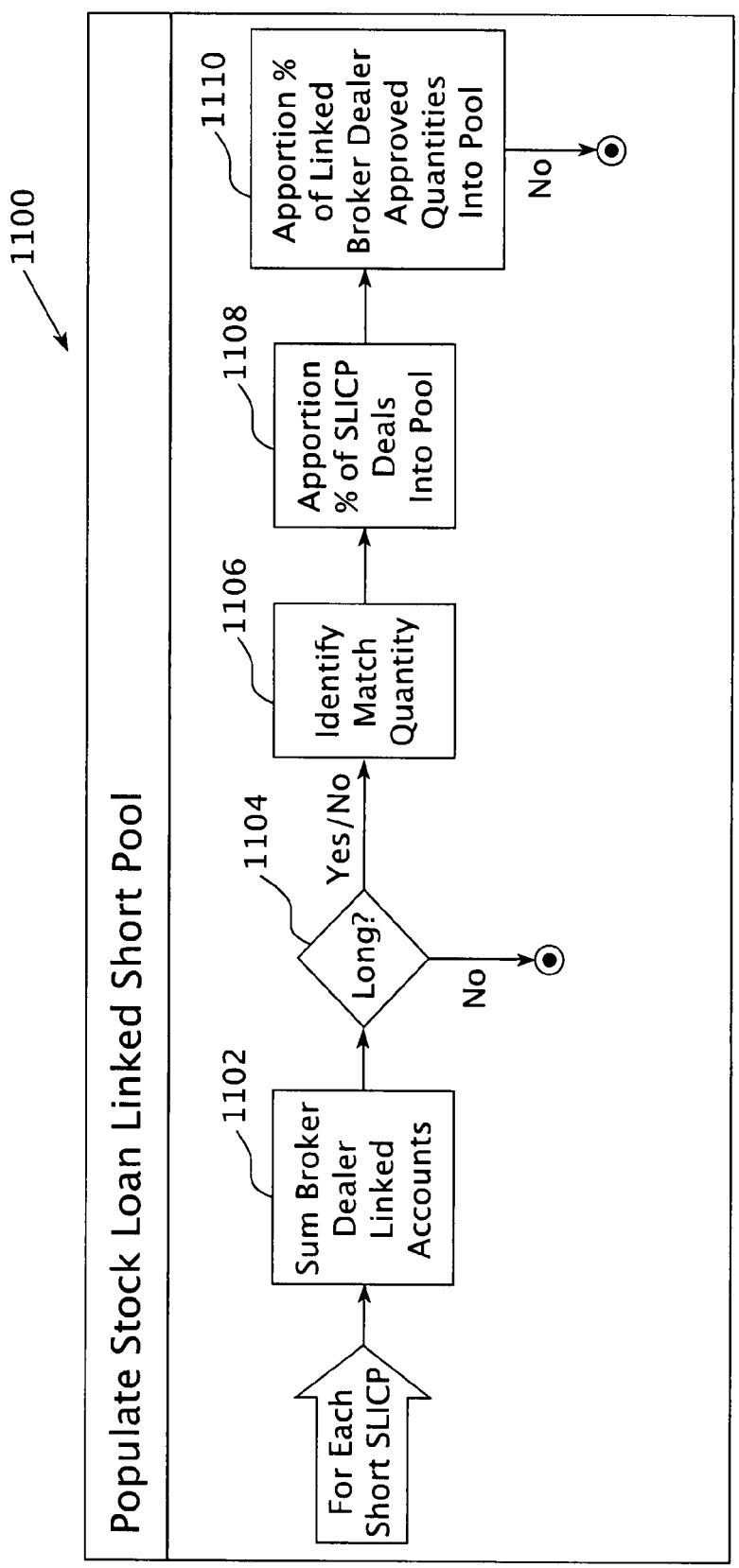

FIG. 11 shows a process flow 1100, according to various embodiments, for populating a Stock Loan Linked Short Pool 807. At step 1102, for each short stock loan book account that exists for the issuer, the corresponding broker dealer accounts (e.g., the link group) may be summed. At step 1104, it may be determined whether the corresponding broker dealer accounts are long. If not, (e.g., if the accounts are flat or short) then the Stock Loan Linked Short Pool 807 may not be created. If the sum is long, then a match quantity corresponding to the linked group and short stock loan book position may be found. The match quantity may represent the portion of the stock loan linked account long positions that can be cancelled by corresponding short positions on the stock loan books. For example, if the sum of the stock loan linked positions is long 100 shares, and the sum of the corresponding stock loan book accounts is short 100 shares, then the matching amount may be 100 shares.

At step 1108, a percentage of the short stock loan book positions may be apportioned to the Stock Loan Linked Short Pool 807. The percentage may correspond to the percentage of the positions represented by the match quantity. The stock loan book positions added to the pool 807 may be selected according to any suitable method. For example, in various embodiments, positions with the highest rate are allocated first. At step 1110, the percentage of the linked broker-dealer accounts may be added to the long side 816 of the Stock Loan Linked Short Pool 807. The allocated broker-dealer accounts may be selected according to any suitable hierarchy. For example, according to a pro rata or fill your boots method.

Positions remaining after the Stock Loan Linked Pools 804 have been balanced may be considered for inclusion in a Manufactured Pool or Pools 806. In various embodiments, the Manufactured Pools 806 may include individual pools for each type of remaining short position. For example, remaining stock loan short positions may be included in a stock loan manufactured pool. Long positions (e.g., stock loan long positions, trader long positions, client long positions, etc.) may be added to the stock loan manufactured pool until it is balanced. The long positions may be chosen according to any suitable method or hierarchy. In various embodiments, though, stock loan long positions may be added to the stock loan manufactured pool first, until none remain. Remaining trader short positions may be included in a trader manufactured pool and matched with long positions, again chosen according to any suitable method or hierarchy. Likewise, remaining client short positions may be added to a client manufactured pool and balanced with long positions. It will be appreciated that various embodiments may include only one manufactured pool.

Any positions remaining after the stock loan linked pools 804 and manufactured pool or pools 806 have been balanced may be included in a Real Pool or pools 808. Real dividends received by the firm may be allocated to these positions. It will be appreciated that different real dividends received by the firm may be of different amounts based on the applicable tax regulations applying to the position holder, the issuer, the firm, etc. For example, when a real dividend is paid, typically the issuer's domicile levies a withholding tax equal to a certain percentage of the dividend. Dividend recipients domiciled in a jurisdiction having a double taxation treaty with the issuer's domicile may be entitled to recover some of the withholding tax as either a tax reclaim from the issuer's domicile or a tax voucher or credit in their own jurisdiction, depending on the terms of the treaty. Some treaties allow for relief-at-the-source, where the withholding tax is eliminated or reduced if the recipient can prove that they are entitled to the benefit of the treaty (e.g., that they are domiciled in a jurisdiction that is a treaty signatory).

Because of this disparate tax treatment of dividends directed to different position holders, the real pool 808, according to various embodiments, may be divided into a real treaty pool and a real non-treaty pool. Positions placed into the real treaty pool may be entitled to receive dividend amounts that reflect relief-at-the-source (e.g., reduced or eliminated withholding tax) and/or other benefits under one or more double taxation treaties. Positions that do not enjoy such benefits may be placed into the real non-treaty pool. Positions may be allocated to the treaty real pool when, for example: (1) the issuer's jurisdiction offers relief at the source; (2) the issuer is eligible for tax reclaim; and (3) the position holder (e.g., client, trader, safe-keep deposit, etc.) is eligible for treaty benefits (e.g., the position holder is a domiciliary of a jurisdiction having a double taxation treaty with the issuer's jurisdiction). Where the issuer's domicile requires pre-certification for relief-at-the-source, position holders may also be required to be pre-certified before their positions will be included in the treaty real pool. Positions not eligible for the treaty real pool may be included in the non-treaty real pool.

Figure 12:
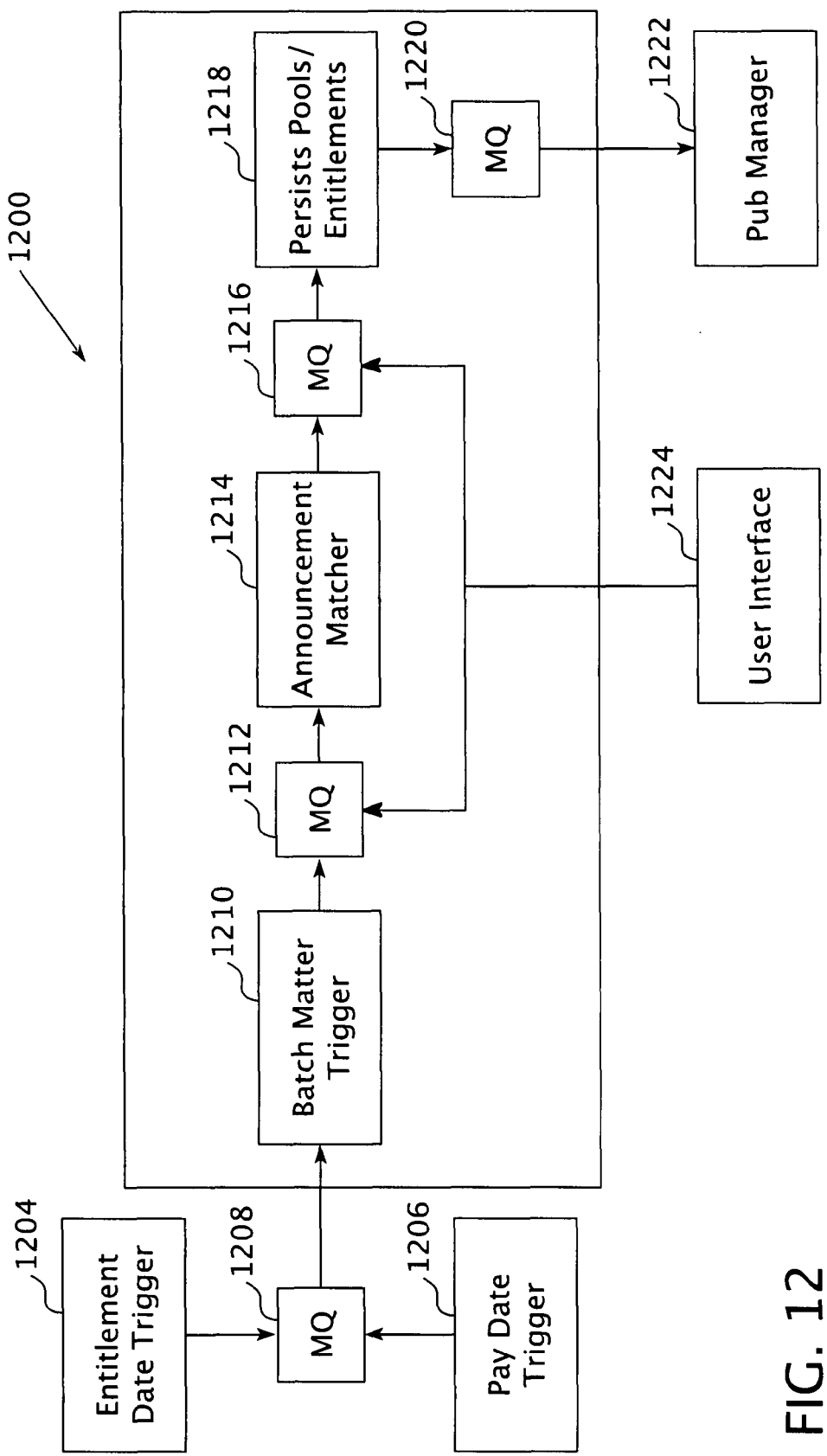
FIG. 12 shows a diagram illustrating a workflow according to various embodiments.

FIG. 12 shows a workflow 1200, according to various embodiments for implementing some or all of the process flows described herein. The workflow 1200 may be performed by various systems including, for example, an Entitlement Manager Broker System 1202. It will be appreciated that the breakdown of steps performed by the Entitlement Manager Broker System 1202 and those performed by other systems may vary in different embodiments. Also, although the workflow 1200 is described with respect to one issuer, it will be appreciated that it may be capable of handling dividend events by multiple issuers either sequentially or simultaneously.

Referring to the workflow 1200, trigger modules 1204 and 1206 may generate triggers indicating various dates relevant to the dividend calculation process. For example, Entitlement Date Trigger module 1204 may generate a trigger when an issuer's stock becomes entitled to a dividend. Pay Date Trigger module 1206 may generate a trigger when an issuer pays a dividend. In various embodiments, triggers generated by the modules 1204 and 1206 may include information regarding the date, the issuer, and the type of trigger (e.g., entitlement, pay date, etc.). The modules 1204, 1206 may forward generated triggers to a message queue 1208, for example, a message queue available from IBM.

The Entitlement Manager Broker System 1202 may retrieve the triggers from the message queue 1208 and process them. A Batch Matter Trigger module 1210 may process each trigger to determine which activities need to be performed in response. For example, the Batch Matter Trigger module 1210 may query a database (not shown) to gather information about the position-holders in the issuer, or any other information relevant to the trigger. The module 1210 may then create a matching trigger, which may be deposited with message queue 1210. The matching trigger may include instructions for and/or indications of processes to be performed later in the dividend accounting process.

The matching trigger may be received by the Announcement Matcher module 1214, which may then perform various tasks to analyze the relevant dividend event. For example, the Announcement Matcher module 1214 may perform some or all of the process flows for dividend entitlement processing described above. Results of the Announcement Matcher module 1214 may be provided to another message queue 1216, where they may be forwarded to the Persist Pools/Entitlements module 1218, which may record the results in the relevant database (not shown). In various embodiments, the module 1218 may also generate an implementation trigger and deposit it at message queue 1220. A Pub Manager 1222 may retrieve the implementation trigger and, in response, may credit the calculated entitlements to the appropriate accounts of clients, traders, etc. In various embodiments, the Pub Manager 1222 may only credit entitlements in response to a pay date trigger. A user interface 1224 may allow a user to monitor and/or manipulate the activities of the workflow 1200. For example, the user may be able to create and/or modify matching triggers, results of the Announcement Matcher module 1214, implementation triggers, etc.

Figure 13:
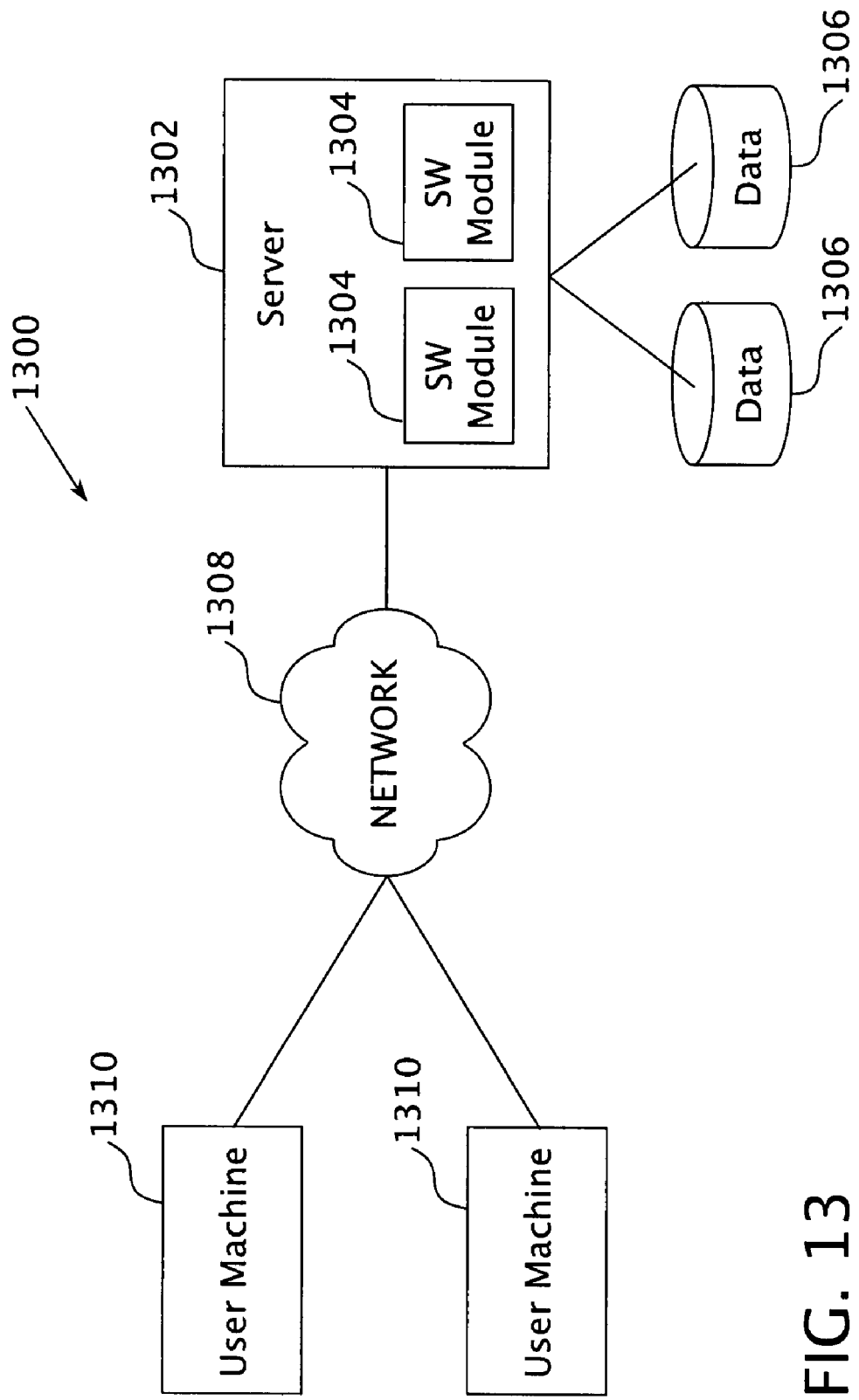
FIG. 13 shows a diagram illustrating a system according to various embodiments.

FIG. 13 shows a computer system 1300 according to various embodiments. The computer system 1300 may be used to calculate, track and/or handle the calculation of dividend entitlements, as described herein. For example, the computer system 1300 may implement the work flow 1200 and/or any of the other process flows described herein. The computer system 1300 may include a server 1302, user machines 1310 and databases 1306. The various components 1302, 1310, 1306 may communicate with one another by utilizing a wired or wireless network 1308 that may be, for example, a local area network (LAN) or wide area network (WAN).

The server 1302 may execute one or more software modules 1304. Each of the software modules 1304 may perform a calculation or task for handling the accounting of dividends. For example, one module 1304 may track the various account positions in an issuer's stock. Another of the modules 1304 may populate one or more of the stock loan pools 506, 508, 510. Yet another of the modules 1304 may be configured to populate one or more of the broker/dealer pools 801, 803, 805. Data necessary to perform the calculations, such as, for example, account information, dividend information, tax regulation information, etc., may be included in one or more of databases 1306.

A user (e.g., an individual associated with the firm or a department thereof) may access the results of calculations performed at the server 1302 from a user machine 1310 via network 1308. For example, the user machine 1310 may provide one or more user interfaces to the user. It will be appreciated that the user interfaces may be provided in any acceptable format including, for example, an e-mail message, a web page, a dedicated application, etc. It will also be appreciated that, in various embodiments, the user machines 1310 may also have some or all of the functionality of the server 1302 and modules 1304, as well as access to databases 1306. In this way, the user machines 1310 may operate independent of the server 1302.

It is to be understood that the figures and descriptions of the present invention have been simplified to illustrate elements that are relevant for a clear understanding of the present invention, while eliminating, for purposes of clarity, other elements, such as, for example, some specific details of tax regulations, accounting practices, etc. Those of ordinary skill in the art will recognize that these and other elements may be desirable. However, because such elements are well known in the art and because they do not facilitate a better understanding of the present invention, a discussion of such elements is not provided herein.

As used herein, the term "stock-loan linked" may refer to a position that is offest by a stock loan position. For example, a stock-loan linked short position may be covered by a borrow and a stock-loan linked long position may have been borrowed.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereat and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The various modules 1304 of the system 1300 may be implemented as software code to be executed by a processor(s) of the system 1300 or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined herein.

We claim:

1. A computer-implemented method of allocating dividends to a plurality of long positions held by a financial services firm in a security from a first issuer, the method comprising:

receiving with a computer data indicating that a dividend has been paid by the issuer on the security, wherein the computer comprises:

a processor; and
    a memory in communication with the processor, wherein the memory is selected from the group consisting of a read only memory (ROM) and a random access memory (RAM);
receiving with the computer data indicating an amount of the dividend;
receiving account data describing positions held by the financial services firm;
identifying with the computer, and considering the account data, a plurality of short positions, wherein the plurality of short positions comprise at least one short position held outright by the financial services firm and at least one short position held by the financial services firm on behalf of a client, and wherein the plurality of short positions are described by the account data;
matching using the computer the plurality of short positions with long positions selected from the plurality of long positions, wherein the plurality of long positions comprise at least one long position held outright by the financial services firm and at least one long position held by the financial services firm on behalf of a client, and wherein the plurality of long positions are described by the account data;
allocating with the computer a manufactured dividend to each of the selected long positions, wherein each manufactured dividend originates from one of the plurality of short positions; and
allocating with the computer a real dividend to any long positions remaining in the plurality of long positions.

2. The method of claim 1, wherein the plurality of short positions comprises stock loan linked short positions, trader short positions, and client short positions, and wherein matching the plurality of short positions with selected long positions comprises:
    identifying the stock loan linked short positions;
    matching the stock loan linked short positions with a portion of the selected long positions;
    after matching the stock loan linked short positions with the portion of the selected long positions, identifying the trader short positions;
    matching the trader short positions with a portion of the selected long positions;
    after matching the trader short positions with a portion of the selected long positions, identifying the client short positions; and
    matching the client short positions with a portion of the selected long positions.

3. The method of claim 1, wherein the plurality of long positions comprises a plurality of stock loan linked long positions, and wherein the selected long positions are chosen from the first plurality of long positions such that stock loan linked long positions are chosen first.

4. The method of claim 3, wherein the stock loan linked long positions are chosen for inclusion in the selected long positions until no stock loan linked long positions remain.

5. The method of claim 3, wherein the stock loan linked long positions are chosen for inclusion in the selected long positions until all positions in the set of short positions are matched.

6. The method of claim 1, wherein identifying the remaining long positions comprises identifying a first portion of the remaining long positions into a first pool and a second portion of the remaining long positions into a second pool, wherein the first portion of the remaining long positions are entitled to a first tax treatment and the second portion of the remaining long positions are entitled to a second tax treatment.

7. A computer-implemented system for allocating dividends to a plurality of long positions held by a financial services firm in a security from a first issuer, the system comprising:
    at least one computer programmed to:
        receive data indicating that a dividend has been paid by the issuer on the security;
        identify a plurality of short positions, wherein the plurality of short positions comprise at least one short position held outright by the financial services firm and at least one short position held by the financial services firm on behalf of a client;
        match the plurality of short positions with long positions selected from the plurality of long positions, wherein the plurality of long positions comprise at least one long position held outright by the financial services firm and at least one long position held by the financial services firm on behalf of a client;
        allocate a manufactured dividend to each of the selected long positions, wherein each manufactured dividend originates from one of the plurality of short positions; and
        allocate a real dividend to any long positions remaining in the plurality of long positions.

8. The system of claim 7, wherein the plurality of short positions comprises stock loan linked short positions, trader short positions, and client short positions, and wherein the at least one computer is further programmed to:
    identify the stock loan linked short positions;
    match the stock loan linked short positions with a portion of the selected long positions;
    after matching the stock loan linked short positions with the portion of the selected long positions, identify the trader short positions;
    match the trader short positions with a portion of the selected long positions;
    after matching the trader short positions with a portion of the selected long positions, identify the client short positions; and
    match the client short positions with a portion of the selected long positions.

9. The method of claim 7, wherein the plurality of long positions comprises a plurality of stock loan linked long positions, and wherein the selected long positions are chosen from the first plurality of long positions such that stock loan linked long positions are chosen first.

10. The method of claim 9, wherein the stock loan linked long positions are chosen for inclusion in the selected long positions until no stock loan linked long positions remain.

11. The method of claim 9, wherein the stock loan linked long positions are chosen for inclusion in the selected long positions until all positions in the set of short positions are matched.

12. The method of claim 7, wherein the computer is further programmed to provide a user interface, the user interface comprising data indicating at least one long position receiving a manufactured dividend and at least one long position receiving a real dividend.

13. A computer readable storage medium having instructions stored thereon that, when executed by a processor, cause the processor to:
    receive data indicating that a dividend has been paid by the issuer on the security;
    receive data indicating an amount of the dividend;
    receive account data describing positions held by the financial services firm;

identify with the computer, and considering the account data, wherein the plurality of short positions comprise at least one short position held outright by the financial services firm and at least one short position held by the financial services firm on behalf of a client, and wherein the plurality of short positions are described by the account data;

match the plurality of short positions with long positions selected from the plurality of long positions, wherein the plurality of long positions comprise at least one long position held outright by the financial services firm and at least one long position held by the financial services firm on behalf of a client, and wherein the plurality of long positions are described by the account data;

allocate a manufactured dividend to each of the selected long positions, wherein each manufactured dividend originates from one of the plurality of short positions; and allocate with the computer a real dividend to any long positions remaining in the plurality of long positions.

14. The computer readable medium of claim 13, wherein the plurality of short positions comprises stock loan linked short positions, trader short positions, and client short positions, and further comprising instructions that when executed by the processor, cause the processor to:

identify the stock loan linked short positions;

match the stock loan linked short positions with a portion of the selected long positions;

after matching the stock loan linked short positions with the portion of the selected long positions, identify the trader short positions;

match the trader short positions with a portion of the selected long positions;

after matching the trader short positions with a portion of the selected long positions, identify the client short positions; and match the client short positions with a portion of the selected long positions.

15. The method of claim 1, wherein the matching comprises:

summing stock loan linked positions from the plurality of short positions and the plurality of long positions with the computer;

finding with the computer a match quantity for each stock loan linked position, wherein the match quantity corresponds to a portion of the stock loan linked position that can be offset by stock loan book positions selected from the plurality of short positions and the plurality of long positions;

if the sum of the stock loan linked positions is short:

apportioning with the computer a percentage of short stock loan book positions to a stock loan linked long pool, wherein the second percentage is equal to the percentage of the stock loan book positions represented by the match quantity; and matching with the computer the stock loan book positions in the stock loan linked long pool with short stock loan linked positions selected from the stock loan linked positions; and if the sum of the stock loan linked positions is long:

apportioning with the computer a second percentage of long stock loan book positions to a stock loan linked short pool, wherein the second percentage is equal to the percentage of the stock loan book positions represented by the match quantity;

matching with the computer the stock loan book positions in the stock loan linked short pool with long stock loan linked positions selected from the stock loan linked positions allocating with the computer any remaining broker/dealer book short positions to a manufactured dividend pool; and matching with the computer the short positions in the manufactured dividend pool with long positions selected from the plurality of broker/dealer book positions.

16. The method of claim 15, wherein the allocating the manufactured dividend to each of the selected long positions comprises allocating with the computer a manufactured dividend to each long position included in the manufactured dividend pool, wherein each manufactured dividend originates from one short position included in the manufactured dividend pool.

17. The method of claim 16, wherein the remaining broker/dealer book short positions comprise stock loan linked short positions, trader short positions, and client short positions, and wherein matching the short positions in the manufactured dividend pool with long positions selected from the plurality of broker/dealer book positions comprises:

identifying the stock loan linked short positions;

matching the stock loan linked short positions with a portion of the long positions;

identifying the trader short positions;

matching the trader short positions with a portion of the long positions;

identifying the client short positions; and matching the client short positions with a portion of the long positions.

18. The method of claim 16, wherein the long positions selected from the plurality of broker/dealer book positions comprise a plurality of stock loan linked long positions, and wherein the selected long positions are chosen from the plurality of broker/dealer book positions such that stock loan linked long positions are chosen first.

19. The method of claim 18, wherein the stock loan linked long positions are chosen for inclusion in the selected long positions until no stock loan linked long positions remain.

20. The method of claim 18, wherein the stock loan linked long positions are chosen for inclusion in the selected long positions until all positions in the set of short positions are matched.

21. The system of claim 7, wherein the matching comprises:

summing stock loan linked positions from the plurality of short positions and the plurality of long positions with the computer;

finding with the computer a match quantity for each stock loan linked position, wherein the match quantity corresponds to a portion of the stock loan linked position that can be offset by stock loan book positions selected from the plurality of short positions and the plurality of long positions;

if the sum of the stock loan linked positions is short:

apportioning with the computer a percentage of short stock loan book positions to a stock loan linked long pool, wherein the second percentage is equal to the percentage of the stock loan book positions represented by the match quantity; and matching with the computer the stock loan book positions in the stock loan linked long pool with short stock loan linked positions selected from the stock loan linked positions; and if the sum of the stock loan linked positions is long:
  apportioning with the computer a second percentage of long stock loan book positions to a stock loan linked short pool, wherein the second percentage is equal to the percentage of the stock loan book positions represented by the match quantity;
  matching with the computer the stock loan book positions in the stock loan linked short pool with long stock loan linked positions selected from the stock loan linked positions
allocating with the computer any remaining broker/dealer book short positions to a manufactured dividend pool; and
matching with the computer the short positions in the manufactured dividend pool with long positions selected from the plurality of broker/dealer book positions.

22. The system of claim 21, wherein the allocating the manufactured dividend to each of the selected long positions comprises allocating with the computer a manufactured dividend to each long position included in the manufactured dividend pool, wherein each manufactured dividend originates from one short position included in the manufactured dividend pool.

* * * * *